May 10, 1949.  E. S. PEARSON  2,469,516
FLEXIBLE LOCKING COUPLING
Filed June 14, 1948　　　　　　　　　　　　　　2 Sheets-Sheet 1
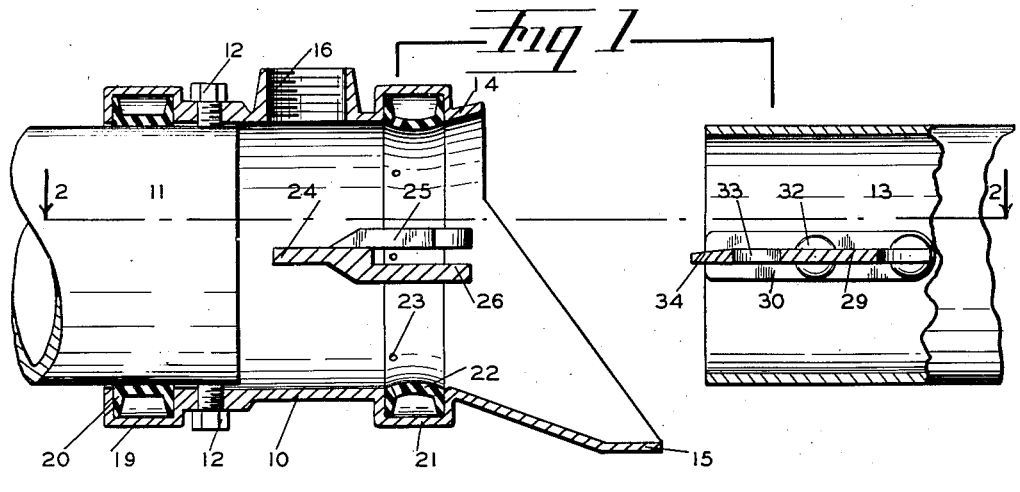
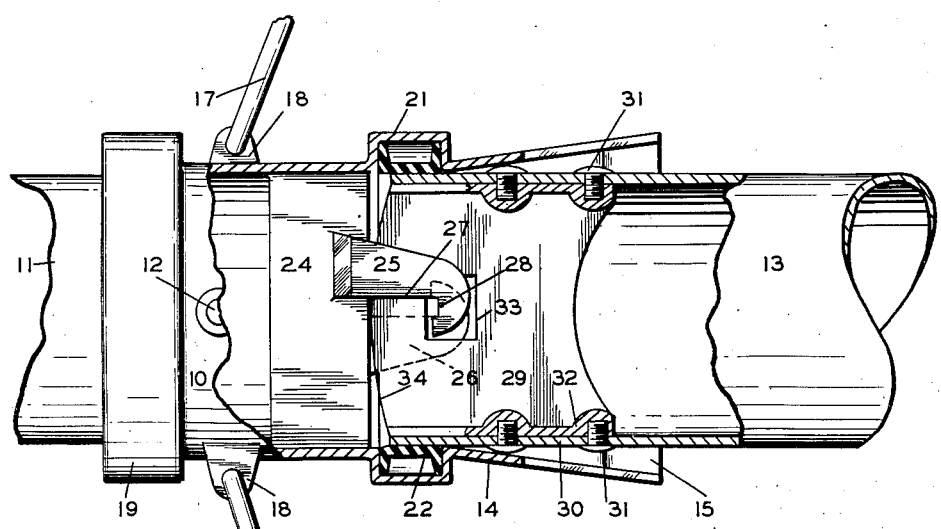
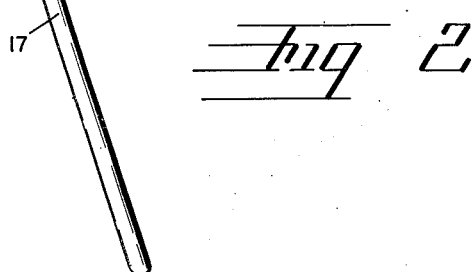
INVENTOR.
EMIL S. PEARSON
BY
ATTORNEY May 10, 1949.　　　　E. S. PEARSON　　　　2,469,516
FLEXIBLE LOCKING COUPLING
Filed June 14, 1948　　　　　　　　　　　2 Sheets-Sheet 2
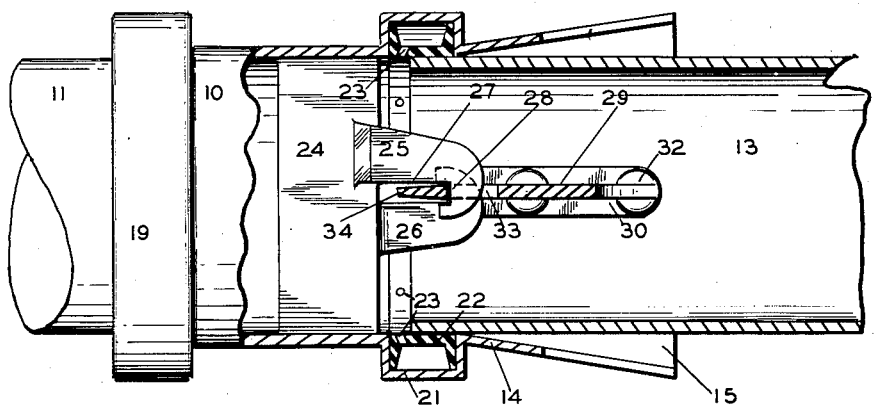
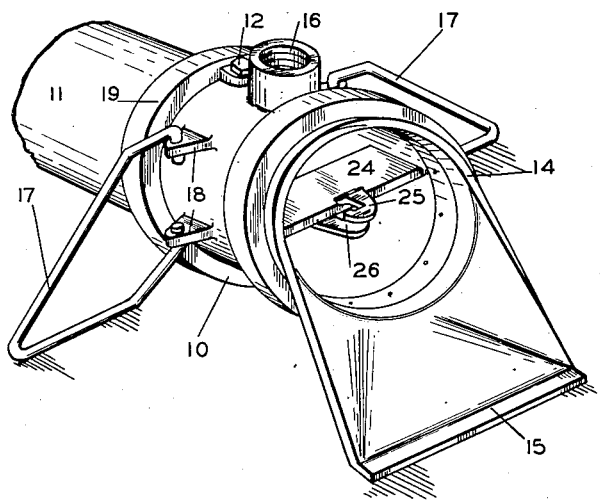
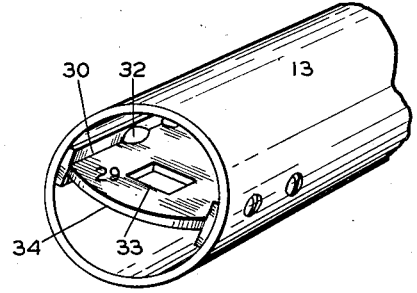
INVENTOR.
EMIL S PEARSON
BY
*T. R. Geisler*
ATTORNEY Patented May 10, 1949

2,469,516

UNITED STATES PATENT OFFICE 2,469,516

FLEXIBLE LOCKING COUPLING

Emil S. Pearson, Portland, Oreg.

Application June 14, 1948, Serial No. 32,769

8 Claims. (Cl. 285—170)

This invention relates to couplings for pipe lines, particularly demountable pipe lines, such as irrigation pipe lines, which are laid along the surface of the ground, and sections of which may require frequent coupling and uncoupling.

One of the objects of this invention is to provide an improved, simple, and practical coupling for irrigation pipe lines and the like by means of which pipe sections can be easily and quickly coupled and uncoupled.

Another object of this invention is to provide a flexible coupling which will permit some movement of the coupled pipe sections out of alignment with each other to enable the pipe sections, when coupled together, to follow irregular contours of the ground surface on which the pipe line is laid.

A further object of this invention is to provide a locking coupling adapted to prevent any separation of the coupled sections should the pipe line be subjected to any inadvertent longitudinal pull or movement.

Several locking couplings and coupling locks have been developed for demountable irrigation pipe lines. To the best of my knowledge all these have exterior locking or latching means of one kind or another, generally comprising a locking latch or hook with a companion engageable element. One of the main objections I have found to such external coupling locking means is that, when this locking means is confined to one side of the coupling only, pressure within the coupled pipe sections will tend to swing one pipe section axially out of alignment with respect to the preceding section to which it is joined. This can readily be observed especially with an end pipe section having a sprinkler mounting. If two locking hooks or latches and companion elements are employed and placed at opposite sides on the outside of the coupling in order to overcome this difficulty then the desirable flexibility of the locking coupling will be largely eliminated and thus such arrangement is objectionable from another standpoint.

An additional and important object of my present invention accordingly is to dispense with such external locking hooks and latches and to substitute for the same a locking coupling in which the locking means will not only be located entirely within the coupling or pipe line but which will provide a flexible locked coupling under all conditions and with which there will be no tendency whatsoever for the water pressure within the pipes to cause one of the locked pipe sections to move out of axial alignment with the other connected pipe section.

These particular objects and other advantages I have attained by providing novel coupling locking elements within the members to be coupled, the construction, arrangement, and operation of which will be apparent from the following brief description with reference to the accompanying drawings.

In the accompanying drawings:

Fig. 1 is a longitudinal sectional elevation of the two members to be coupled, but, for the sake of clarity, showing the two members entirely separated from each other;

Fig. 2 is a plan section, corresponding to the line 2—2 of Fig. 1, but showing the two members of Fig. 1 brought together into coupled position;

Fig. 3 is a plan section similar to Fig. 2, but showing the coupled member on the right after having been rotated 90° from the position in Fig. 2 so as to bring the two members into the final desired coupled and locked position;

Fig. 4 is a perspective view of the coupling member on the left in Figs. 1, 2 and 3; and Fig. 5 is a perspective view of the other member of the coupling shown on the right in Figs. 1, 2 and 3.

In Figs. 1 to 4, inclusive, the reference character 10 indicates the principal member of the coupling. This coupling member 10 is firmly secured to the end of a length of pipe 11 by any suitable means, such as the screws 12 (Fig. 1). The other member of the coupling is a pipe section 13 (Figs. 1, 2, 3 and 5) within the end of which one of the locking elements is secured as hereinafter explained.

The pipes 11 and 13 are of the same diameter, being sections of the pipe line, and, as apparent from the drawings, the internal diameter of the coupling member 10 is slightly larger than the external diameter of the pipe sections.

The coupling member 10 is formed with a flared bell-end 14, the lower half of which is extended and terminates at the bottom in a flattened base rest 15. When the pipe member 13 is moved into coupled position with reference to the member 10, this extended portion of the bell-end 14 guides the end of pipe 13 and thus facilitates the bringing of the members into coupling position. The base rest 15 also aids in keeping the coupling member 10 in position on the ground.

The coupling member 10 is provided with the usual internally-threaded nipple 16 (Figs. 1 and 4) to enable a riser pipe and sprinkler head to be mounted thereon. I have found that when demountable irrigation pipe lines carry riser pipes and sprinkler heads it is often desirable to provide additional means for holding the pipe line steady against any tendency to rotate or sway with the operation of the sprinklers, and for this purpose I provide a pair of side rests 17 (Fig. 4) pivotally attached to a pair of ears 18 on the exterior at each side of the coupling member 10.

An annular channel 19 is formed on the inner end of the coupling member 10 and a U-shaped rubber sealing ring 20 (Fig. 1) provides a sealing connection between the coupling member 10 and the pipe section 11 to which it is secured. A similar annular channel 21 is provided adjacent the bell-end 14 of the coupling member 10, and a similar U-shaped sealing ring 22 placed therein provides a flexible seal between the member 10 and the inserted end of the pipe member 13 (Figs. 2 and 3). These U-shaped sealing rings 20 and 22 are formed with perforations 23 so as to permit the water under pressure to pass into the ring-lined channels and thus to cause the walls of the sealing rings to press firmly against the metal surfaces with which they are in contact. In this way seals are secured which become tighter as the pressure of the water in the pipe line increases.

A web 24 extends diametrically across the interior of the coupling member 10 and a pair of latch hooks 25 and 26, which are identical in shape but oppositely arranged, and which are preferably formed integral with the web 24, extend from opposite faces of the web in spaced and substantially parallel planes. As shown most clearly in Figs. 2 and 3, each of the hooks 25 and 26 has a straight inner edge 27 which extends parallel to the axis of the coupler and terminates at the outer end in a rectangularly shaped notch 28.

A latch plate 29 is placed inside the end of the coupling pipe section 13 and extends diametrically across the inside of the pipe. This latch plate 29 is formed with lateral flanges 30 at each side and the latch plate is secured in position in the pipe 13 by means of screws 31 which extend through the pipe wall into threaded recesses provided in the flanges 30 and in the internal integral bosses 32 of the plate.

A centrally-spaced rectangular opening 33 is provided in the latch plate 29 as shown most clearly in Fig. 5. The location of this rectangular opening 33 with respect to the front edge 34 of the latch plate 29 is such that the distance between the front wall of the opening 33 and the front edge 34 of the latch plate will be slightly less than the distance between the tips of the hooks 25 or 26 and the edge of the web 24. This will be apparent from Figs. 2 and 3. Also, as apparent from Figs. 2 and 3, the rectangular opening 33 is made sufficiently large to enable the hooks 25 and 26 to pass freely through the opening.

The locking of the coupling members is accomplished in the following manner: The coupling member 10 is set on the ground so as to rest on its base rest 15, and thus with the interior web 24 more or less horizontal. The pipe member 13, with its latch plate 29 also in substantial horizontal position, is pushed into the coupling member 10. The front portion of the latch plate 29 will pass in between the hooks 25 and 26 until the front edge 34 of the latch plate contacts the edge of the web 24. The two coupling members will now be in the relative positions illustrated in Fig. 2. The pipe member 13 is then rotated approximately 90° in clockwise direction as viewed from the right in Fig. 2. (Rotation in the opposite direction would be impossible since the latch plate 29 would contact the opposed faces of the hooks 25 and 26; also with the hooks 25 and 26 positioned as shown in Figs. 2 and 3, rotation of the member 13 and latch plate 29 in clockwise direction would, as will be apparent, be limited to approximately 90° since continuation of such rotation much further would cause the latch plate 29 to engage the inner straight edges 27 of the hooks.) Finally, the pipe member 13, after being given such 90° rotation, is pulled slightly longitudinally outwardly. This causes the outer wall of the latch plate opening 33 to engage the bottoms of the notches 28 of the hooks. The coupling members and their various elements will now be in the final locked position illustrated in Fig. 3.

When the members of the coupling are in this final locked position, as illustrated in Fig. 3, not only will they be held against separation or longitudinal movement in opposite directions, but any considerable rotation of one member with respect to the other will be prevented since such rotation in either direction would cause the latch plate to bear against the walls of the notches 28 at one side or the other.

To unlock the coupled members it is first necessary to push them slightly towards each other, thus to push the pipe member 13 inwardly until the front edge 34 of the latch plate 29 again contacts the edge of the web 24, and then to rotate pipe member 13 in the reverse or counter-clockwise direction so as to bring the pipe member 13 back into the relative position of Fig. 2. When this is done the members may be pulled apart.

Thus the hooks 25 and 26 not only prevent longitudinal separation of the coupling members when the coupler is in locked position but the notches in the hooks also prevent inadvertent reverse rotation into unlocked position until one of the coupling members is first given a slight shove towards the other.

When the coupling is in the locked position of Fig. 3 the pipe member 13 may be moved slightly out of axial alignment with the coupled member 10 without unlocking the coupling and without interfering with the sealing between the two coupling members. Thus a flexible coupling is provided as well as a coupling in which the coupled members are restricted as to their relative rotation. Furthermore since the locking takes place along the central or axial line of the coupling members, the pressure of the water will have no tendency to push the coupled members out of axial alignment with respect to each other.

All of these desired results are accomplished without any external locking or clamping means and without the aid of any pivotally mounted latches which are apt to stick or get broken with rough handling.

Preferably the outer edges of the hooks 25 and 26 are rounded as shown in the drawings, and the outer edge 34 of the latch plate is also preferably formed with a convex curve. The rounding and curving of these edges facilitates the bringing of the latch plate and latch hooks into proper relative positions preparatory to the locking of the flexible coupling. Thus, for example, if the pipe member 13 were inserted into the coupling member 10 with the latch plate 29 nearer vertical instead of horizontal, when the web 24 in the coupling member 10 is horizontal, the rounded outer edges of the hooks 25 and 26, when brought into engagement with the outer edge 34 of the latch plate 29, would have a tendency to turn the latch plate 29, and therewith rotate the pipe member 13, until the latch plate 29 would be brought into the plane of the web 24 and consequently able to pass in between the hooks 25 and 26 as required preparatory to locking. The convex curvature of the outer edge 34 of the latch plate 29 also permits the pipe member 13 to be moved the proper distance into the coupling member 10 even though the members are not in axial alignment, and this curved edge aids in the unlocking of the coupling under similar conditions and thus is a factor in achieving more flexibility for the coupling.

Several modifications could be made in the particular construction of the parts and elements of the coupling which I have illustrated and described without departing from the principle of my invention. It is not necessary that the web 24 in the coupling member 10 be horizontally positioned when this member is resting on the ground. The web 24 could be positioned vertically or obliquely so long as it extends diametrically across the interior of the coupling member 10. However, in my opinion, having the web 24 positioned horizontally is slightly more convenient. The location of the web 24 and latch plate 29 might be reversed, and thus the web and hooks positioned in the pipe member 13 and the latch plate correspondingly positioned in the coupling member 10. The hooks 25 and 26 could be made without the notches 28. However, this would enable the pipe member 13 to be reversely rotated into unlocked position more readily. Consequently I prefer to have the hooks notched as illustrated in the drawings. My invention could also be carried out if one hook were employed instead of two as I have shown and described. The arrangement of the two spaced hooks, however, results in a steadier and more positive locking engagement of the members and is preferable for that reason. Also, if one of the hooks should inadvertently be broken off from the supporting web, the remaining hook would enable the coupling member to continue in operation.

It is not my intention to restrict my invention to the particular embodiment which I have illustrated and described or otherwise limit the invention except as set forth in the claims.

I claim:

1. In a pipe coupling, a pair of coupling members adapted to be arranged in telescoping position, a latch hook located near the axis of one of said members and extending parallel to the axis of said latter mentioned member, means for rigidly mounting said latch hook in said latter mentioned member, and a latch plate mounted in the other coupling member, an opening in said latch plate to enable said latch hook to extend through said opening when said coupling members are in locked position.

2. In a coupling for irrigation pipes, a pair of coupling members adapted to be arranged in telescoping position, a web extending across the interior of one of said members, a latch hook extending from said web substantially parallel to the axis of said latter mentioned member, and a latch plate mounted in the other coupling member and extending diametrically across the interior of said other coupling member, a centrally-spaced opening in said latch plate to enable said latch hook to extend through said opening when said coupling members are in locked position.

3. In a flexible locking coupling for irrigation pipes, a main coupling member and a pipe member adapted to be inserted in said main member, means for securing said main coupling member on the end of a pipe section, a latch hook located near the axis of said main coupling member and extending parallel to the axis of said main coupling member, means for rigidly mounting said latch hook in said main coupling member, and a latch plate centrally mounted in said pipe member and extending diametrically across the interior of said pipe member, a rectangular opening in said latch plate to enable said latch hook to extend through said opening when said coupling members are in locked position.

4. In a pipe coupling of the character described, a pair of coupling members adapted to be arranged in telescoping position, a web extending diametrically across the interior of one of said members, a latch hook extending from said web substantially parallel to the axis of said latter mentioned member, and a latch plate mounted in the other coupling member and extending diametrically across the interior of said other coupling member, an opening in said latch plate to enable said latch hook to extend through said opening when said coupling members are in locked position, whereby when said coupling members are moved into telescoping position said latch plate and said latch hook will be in parallel overlapping position and partial rotation of one of said members with respect to the other will cause said latch hook to extend through said latch plate opening and engage said latch plate.

5. In a flexible locking pipe coupling, a main coupling member and a pipe member adapted to be inserted in said main member, a web extending diametrically across the interior of said main coupling member, a pair of latch hooks extending from opposite faces of said web substantially parallel to the axis of said main coupling member, said latch hooks being similar but oppositely arranged, and a latch plate mounted in said pipe member and extending diametrically across the interior of said pipe member, a centrally spaced rectangular opening in said latch plate to enable said latch hooks to extend through said opening when said coupling members are in locked position, whereby when said pipe member is inserted in said main coupling member said latch plate will be parallel to and positioned between said latch hooks and partial rotation of one of said members with respect to the other will cause said latch hooks to extend through said latch plate opening and engage said latch plate.

6. In a flexible locking pipe coupling of the character described, a bell-end member and a spigot member, means for securing said bell-end member on the end of a pipe section, a web extending diametrically across the interior of one of said members, a pair of latch hooks extending from opposite faces of said web substantially parallel to the axis of said latter mentioned member, said latch hooks being similar but oppositely arranged, each of said latch hooks having a straight inner edge extending substantially parallel to the axis of said latter mentioned member and terminating in a notch, and a latch plate mounted in the other coupling member, and extending diametrically across the interior of said other coupling member, a centrally-spaced opening in said latch plate to enable said latch hooks to extend through said opening when said coupling members are in locked position, whereby when said spigot member is inserted in said bell-end member said latch plate will be parallel to and positioned between said latch hooks and partial rotation of one of said members with respect to the other will cause said latch hooks to extend through said latch plate opening and engage said latch plate.

7. A flexible locking pipe coupling of the character described including a pair of coupling members adapted to be arranged in telescoping position, a web extending diametrically across the interior of one of said members, a pair of latch hooks extending from opposite faces of said web substantially parallel to the axis of said latter mentioned member, said latch hooks being similar but oppositely arranged and each terminating in a rectangularly shaped notch, and a latch plate centrally mounted in the other coupling member and extending diametrically across the interior of said other coupling member, an opening in said latch plate to enable said latch hooks to extend through said opening when said coupling members are in locked position, whereby when said coupling members are moved into telescoping position said latch plate will be parallel to and positioned between said latch hooks and partial rotation of one of said members with respect to the other will cause said latch hooks to extend through said latch plate opening and engage said latch plate.

8. A flexible locking coupling for irrigation pipes comprising a main coupling member and a pipe member adapted to be inserted in said main member, means for securing said main coupling member on the end of a pipe section, means for supporting said main coupling member against rotation on the ground, a web extending diametrically across the interior of said main coupling member, a pair of latch hooks extending from opposite faces of said web substantially parallel to the axis of said main coupling member, said latch hooks being similar but oppositely arranged, each of said latch hooks having a straight inner edge extending substantially parallel to the axis of said main coupling member and terminating in a rectangularly shaped notch, the outer edge of each of said hooks being rounded, and a latch plate centrally mounted in said pipe member and extending diametrically across the interior of said pipe member, a centrally-spaced opening in said latch plate to enable said latch hooks to extend through said opening when said coupling members are in locked position, whereby when said pipe member is inserted in said main coupling member said latch plate will be parallel to and positioned between said latch hooks and partial rotation of one of said latches with respect to the other will cause said latch hooks to extend through said latch plate opening and engage said latch plate.

EMIL S. PEARSON.

No references cited.